(12) United States Patent
Di Felice et al.

(10) Patent No.: US 11,262,067 B2
(45) Date of Patent: Mar. 1, 2022

(54) VARIOUSLY CONFIGURABLE BIOMASS-FUELLED POLYGENERATION PLANT

(71) Applicant: RESET S.R.L., Rome (IT)

(72) Inventors: Luciano Di Felice, Rome (IT); Valerio Manelfi, Rome (IT); Stefano Manelfi, Rome (IT); Emanuele Melchiorri, Rome (IT); Luigi Iannitti, Rome (IT)

(73) Assignee: RESET S.R.L., Rome (IT)

( * ) Notice: Subject to any disclaimer, the term of this patent is extended or adjusted under 35 U.S.C. 154(b) by 115 days.

(21) Appl. No.: 16/629,619

(22) PCT Filed: Jul. 10, 2018

(86) PCT No.: PCT/IB2018/055065
§ 371 (c)(1),
(2) Date: Jan. 9, 2020

(87) PCT Pub. No.: WO2019/016644
PCT Pub. Date: Jan. 24, 2019

(65) Prior Publication Data
US 2021/0148568 A1    May 20, 2021

(30) Foreign Application Priority Data
Jul. 18, 2017   (IT) .................. 102017000081333

(51) Int. Cl.
*F23G 5/027*   (2006.01)
*F23G 7/00*    (2006.01)
*F23G 7/10*    (2006.01)

(52) U.S. Cl.
CPC ............. *F23G 5/027* (2013.01); *F23G 7/001* (2013.01); *F23G 7/105* (2013.01);
(Continued)

(58) Field of Classification Search
CPC .......... F23G 5/027; F23G 7/001; F23G 7/105; F23G 2201/10; F23G 2201/40; F23G 2201/60
See application file for complete search history.

(56) References Cited

U.S. PATENT DOCUMENTS

2016/0014961 A1    1/2016   Force

FOREIGN PATENT DOCUMENTS

| EP | 2910711 A1 | 8/2015 |
|----|------------|--------|
| WO | 2004/042844 A2 | 5/2004 |
| WO | 2005/120713 A1 | 12/2005 |

OTHER PUBLICATIONS

International Search Report, dated Jun. 12, 2018, from corresponding PCT application No. PCT/IB2018/055065.
(Continued)

*Primary Examiner* — David J Laux
(74) *Attorney, Agent, or Firm* — Nixon & Vanderhye

(57) ABSTRACT

Polygeneration plant, fueled with biomass from various sources and with rated power included between 30 kW and 200 kW, including a plurality of specialised modules, the modules being at least one first module for loading and drying the biomass; at least one second gasification module suitable for producing the syngas starting from the biomass; at least one third module for automating and controlling the polygeneration process associated to the plant. The polygeneration plant includes at least one fourth module including at least one fuel cell, the fuel cell being of the SOFC or MCFC, PEMFC, PAFC, AFC type.

20 Claims, 5 Drawing Sheets

(52) U.S. Cl.
CPC ...... *F23G 2201/10* (2013.01); *F23G 2201/40* (2013.01); *F23G 2201/60* (2013.01)

(56) References Cited

OTHER PUBLICATIONS

Written Opinion, dated Jun. 12, 2018, from corresponding PCT application No. PCT/IB2018/055065.

VARIOUSLY CONFIGURABLE BIOMASS-FUELLED POLYGENERATION PLANT

TECHNICAL FIELD

The present invention refers to the mechanical industry and the power industry. More in detail, the present invention refers to a distinctive polygeneration power plant, that can be fueled using biomass from various sources, characterised by its high compactness and versatility for the various needs of the appliance for which said plant is designed.

STATE OF THE ART

As of date, most micro-cogeneration plants available in the market and implemented by gasification sections for producing syngas starting from biomass, typically obtained from wood, are mainly designed on skids and they are generally installed in buildings designated for housing and use thereof. The few examples of modular installations in a container or casings do not provide for actual plug & play solutions and in particular there are no truly integrated plants in that they do not provide for screening, drying, crushing, briquetting and storage of the wood chips on board a machine. The fuel screening, drying, crushing and briquetting units are designated for outdoor specialised plants that do not have an actual continuity with the actual gasification systems, comprised in said cogeneration plants, and meant for producing syngas.

The criticalities associated to this type of known plants lie in: the need to manage plants with independent logics and not integrated in a single monitoring, i.e. with different specifications specifically built by various manufacturers; the need to install more than one plant and have several persons capable of guaranteeing the operation each one for the plant thereof; the need for preparing larger dedicated surfaces for installations requiring larger, expensive and impacting concrete works for making foundations.

Furthermore, the plants with gasification sections usually produce a considerable amount of TAR (up to 5-6% by weight) which should be disposed periodically. This implies considerable environmental and management burden that has actually hampered the growth of the use of this type of plants.

Though the wood specifications regarding moisture and size are clearly defined, there is no market capable of supplying fuel as required by the manufacturers of the plants currently available in the market. This aspect strongly contradicts the demand by manufacturers of all plants currently available in the market to have a wooden precursor, typically wood chips, with defined and uniformly distributed characteristics. Such limitation reflects in the main cause of poor popularity of use of syngas plants: wood never meets the specific requirements neither in terms of size nor moisture content and this creates major problems related to the operation of the plant, and even without any guaranteed supply.

An example of a micro-cogeneration plant that overcomes the aforementioned problems and in particular the problem related to providing the wooden precursor in a particular formulation and with characteristics such to make said precursor suitable for a conversion into high efficiency syngas and with high transformation reproducibility characteristics, is described in the Italian patent application no 102016000111822 which is still covered by secret at the date of filing of the present document. More in detail, said document describes a compact cogeneration plant which enables providing an initial substrate, i.e. a wooden material biomass, with optimal characteristics for inducing a conversion free of all the problems currently observed in cogeneration plants that use wood as the initial solid biomass. This result is obtained due to a section that integrates—in the plant—a system for the screening, drying, and formulation of the briquettes made of solid biomass used as a fuel. The object of the present invention, described in detail hereinafter, is to provide a new and distinctive plant, specifically a polygeneration plant, in some aspects similar to the one described in the aforementioned prior art document, but which is modified and implemented by distinctive sections and structural characteristics that offer the appliances new and further advantages, primarily but not exclusively lying in the possibility of channeling and storing the hydrogen gas produced by the gasification process, making the plant configurable as a function of the power generation needs (polygeneration) and in the power production flexibility in case of failure of some components.

DESCRIPTION OF THE INVENTION

The present description regards a biomass-fueled polygeneration plant configurable with electrical power values comprised between 30 kW and 200 kW and typically, but not limitedly, with electrical rated power of 99.8 kW. Said plant is macroscopically characterised by its consistent compactness and its high degree of modularity and assemblability, obtaining a variously configurable structure, by joining the various modules comprised therein representing structures that can be perfectly integrated with respect to each other so as to meet the various needs of the end appliance.

More in detail, the biomass-fueled polygeneration plant subject of the present industrial invention patent application, is substantially characterised in that it comprises integrated modules that not only enable manufacturing specific substances, specifically $H_2$ and $CO_2$ intended for various purposes, but as well as for the possibility of variously configuring said modules, so that the remainder of the plant can be particularly suitable for the specific needs of the appliance.

Even more in detail, the polygeneration plant in question comprises base modules such as: at least one module for loading the initial biomass; at least one module for the gasification and production of syngas; and at least one control module. The following is distinctively added to said modules: at least one module for producing hydrogen and/or at least one module containing at least one fuel cell; and/or at least one cogeneration module.

Said biomass loading module specifically comprises: a section for storage on board a machine with the optional screening function, drying function: crushing function, briquetting function, with the additional storage optional system, and with the optional external conveyor belt per for the automatic loading of biomass from the external storage.

Said gasification module comprises at least one gasification unit, at least one syngas pre-treatment unit and at least one emergency torch. Said gasification modules can be variously dimensioned, having various sizes depending on the overall power of the machine and the chosen configuration.

Said hydrogen production module is the specialised module for the thrust cleaning of the syngas intended for the separation of hydrogen and compression thereof in line for the end appliance. Depending on the power of the plant and needs of the end appliance, this module may contain or not contain the fuel cell.

Said module containing the fuel cell comprises, by way of non-limiting example, a fuel cell of the SOFC (Solid Oxide), PEMFC (Proton Exchange Membrane), AFC (Alkaline), MCFC (Molten Carbonate), PAFC (phosphoric Acid) type etc., depending on the configuration of the plant and the required size, with or without hydrogen separation devices.

Said cogeneration module comprises the cogeneration section comprising at least one, preferably at least two internal combustion engines suitably transformed for gas fueling, deriving from the Otto or Diesel cycle, with relative heat recovery system.

Said control module comprises at least one electric panel, at least one interconnection panel and at least one monitoring station as provided for by the SCADA control systems.

It should be observed that the engine exhaust gases can, in some embodiments of the plant, provide for a particulate holding station and catalytic conversion sections as a function of any use of fumes and any regulations to be applied at the plant installation site.

It should also be observed that, irrespective of the final configuration chosen for the plant, it is linked to the same software (SCADA) which enables full remote control thereof. Clearer, the various parts included in the aforementioned modules, as well as the very modules, can be enabled or disabled in the software depending on whether installation is provided or not provided for in the final configuration of the plant.

Furthermore, the polygeneration plant is such to be able to enable it to be delivered completely assembled, wired and tested, ready for connection to the power mains and with the terminals (flanges) of the customer's systems for the use of heat, $H_2$ and/or $CO_2$ (PLUG & PLAY mode).

Before getting into details as concerns the description of the plant subject of the present industrial invention patent application, it should be observed that the advantages offered by said plant are such to meet the types/needs (customer) that are extremely different from each other. By way of non-limiting example, said plant, in the various possible configurations, is capable of meeting the needs of users requiring low heat consumption, i.e. that prefer maximization of electrical power; users interested in using hydrogen, by way of non-limiting example, for mobility; users interested in intensive farming supported by air enriched with $CO_2$ (carbon fertilisation—negative $CO_2$ cycle) and for the countless needs that meet all possible configurations of the plant derivable from the easy and distinctive modularity. Advantageously, the polygeneration plant according to the present invention does not generate waste required to be gotten rid of through disposal in landfills or through other systems. Advantageously, the power supply thereof is of the "polyfuel" type this implying that the biomass that fuels it upstream can be represented either by virgin wood chips and/or briquettes obtained using biomass from various sources, by way of non-limiting example from purification sludge, anaerobic digestion processes, Organic Fraction of Municipal Solid Waste (OFMSW), screening of the chips or pruning even more fine crushed, enabling the use of waste material produced physiologically by the screening operation.

Advantageously, its versatility—derivable from its degree of modularity as well as from the ensuing variable configurability—thus enables to obtain—starting from the bass—power in various forms, by using fuel cells, and $H_2$ by using special separation systems, using or without using conventional GenSet systems.

Advantageously, and as previously mentioned, its variable configurability enables adapting the plant diagram as a function of the use needs.

Production of syngas can be advantageously optimised as a function of the configuration of the plant, enriching or not enriching gasification with water vapour and/or air enriched with $O_2$.

The polygeneration plant in question advantageously enables a negative $CO_2$ balance due to the possibility of re-utilising part of the produced $CO_2$.

BRIEF DESCRIPTION OF THE DRAWINGS

The invention will be described herein with reference to the attached drawings wherein.

Figure 1:
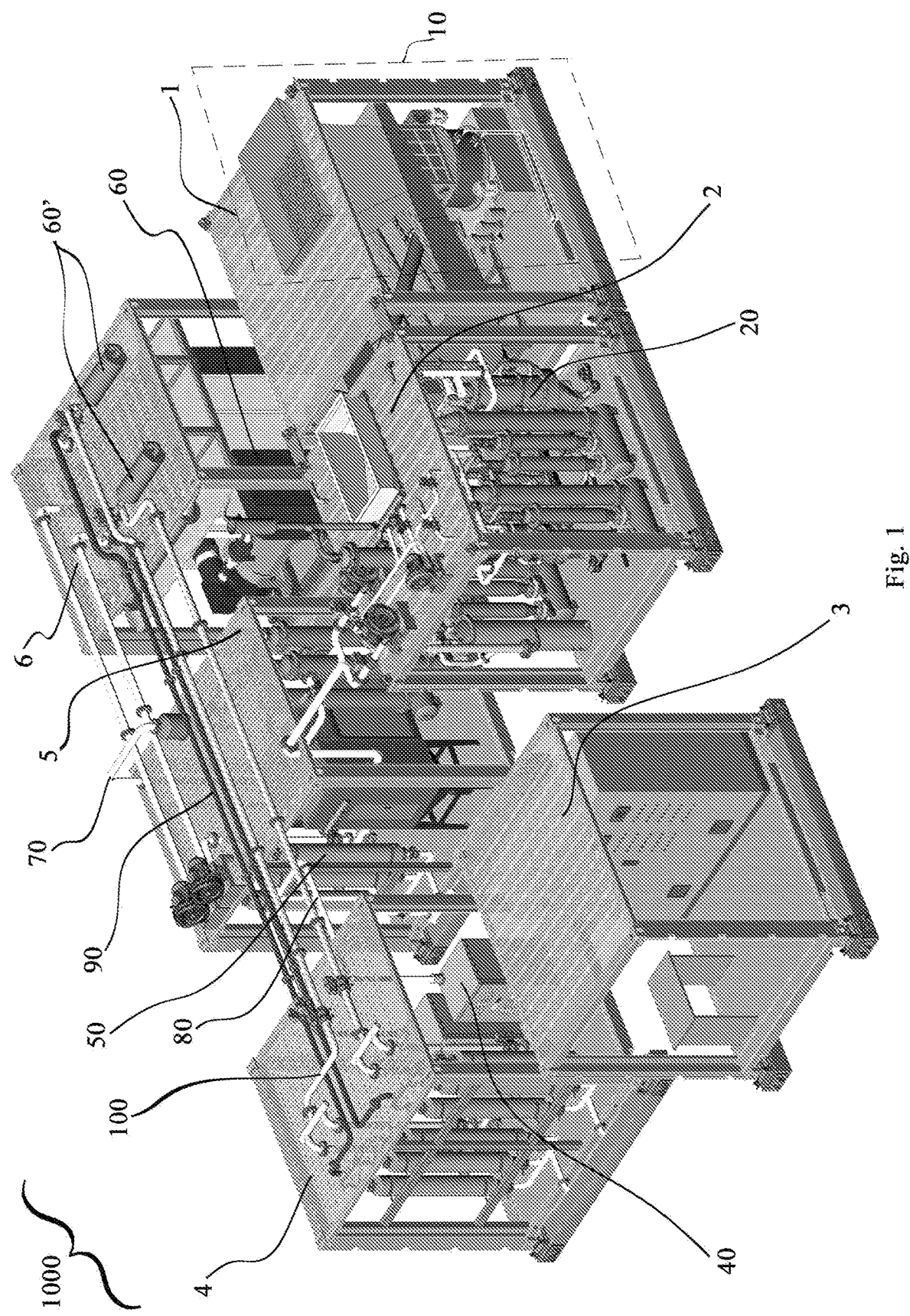
FIG. 1 shows a perspective view of the polygeneration plant 1000 subject of the present industrial invention patent application.

More in detail, the figure in question shows the plant comprising all of its six modules. Specifically, said figure shows the presence of the first module 1 for the storage and loading of wood biomass; the second syngas gasification module 2; the third module 3 for the automation and control of the process associated to said plant; the fourth module 4 comprising at least one fuel cell; the fifth module 5 for separating hydrogen from the syngas produced previously in said second gasification module 2; and the sixth cogeneration module 6. Some of the main components included in some of said modules are also indicated. Specifically, in said first module 1 there can be observed the unit 10 for loading the biomass provided with the optional screening, crushing, drying and briquetting of said biomass, i.e. wood chips. In said second gasification module 2 there can be observed the presence of at least one gasification reactor 20. In said fourth module 4, the presence of at least one fuel cell 40 is indicated. In said fifth module 5, the presence of hydrogen separation systems 50 is indicated. In said sixth module 6 the presence of at least one internal combustion engine 60 is indicated.

The figure in question also shows some of the main lines indicating the path of syngas between the various modules and subjected to the transformations thereof in the polygeneration process. More in detail, the following are indicated: the first lines 70 representing the path of the syngas coming from the gasification reactors so as to be possibly stripped of hydrogen and for reaching the cogeneration section; the second lines 80 representing the path of the hydrogen previously separated from syngas and reaching the fuel cells contained in said fourth module 4; the third lines 90 indicating the path of the products deriving from the combustion (typically the products observable at the end of the combustion are $CO_2$, $N_2$ and $H_2O$) of all substances initially contained in the syngas, to reach the exhaust pipes 60' observable in said sixth module 6; and lastly the fourth lines 100 indicating the path of the remainder of exhausted/burnt gases from which $CO_2$ was separated to reach the aforementioned exhaust pipes 60' too. To this end, said fourth module 4 comprises special and known systems for separating $CO_2$ by absorption.

Figure 2:
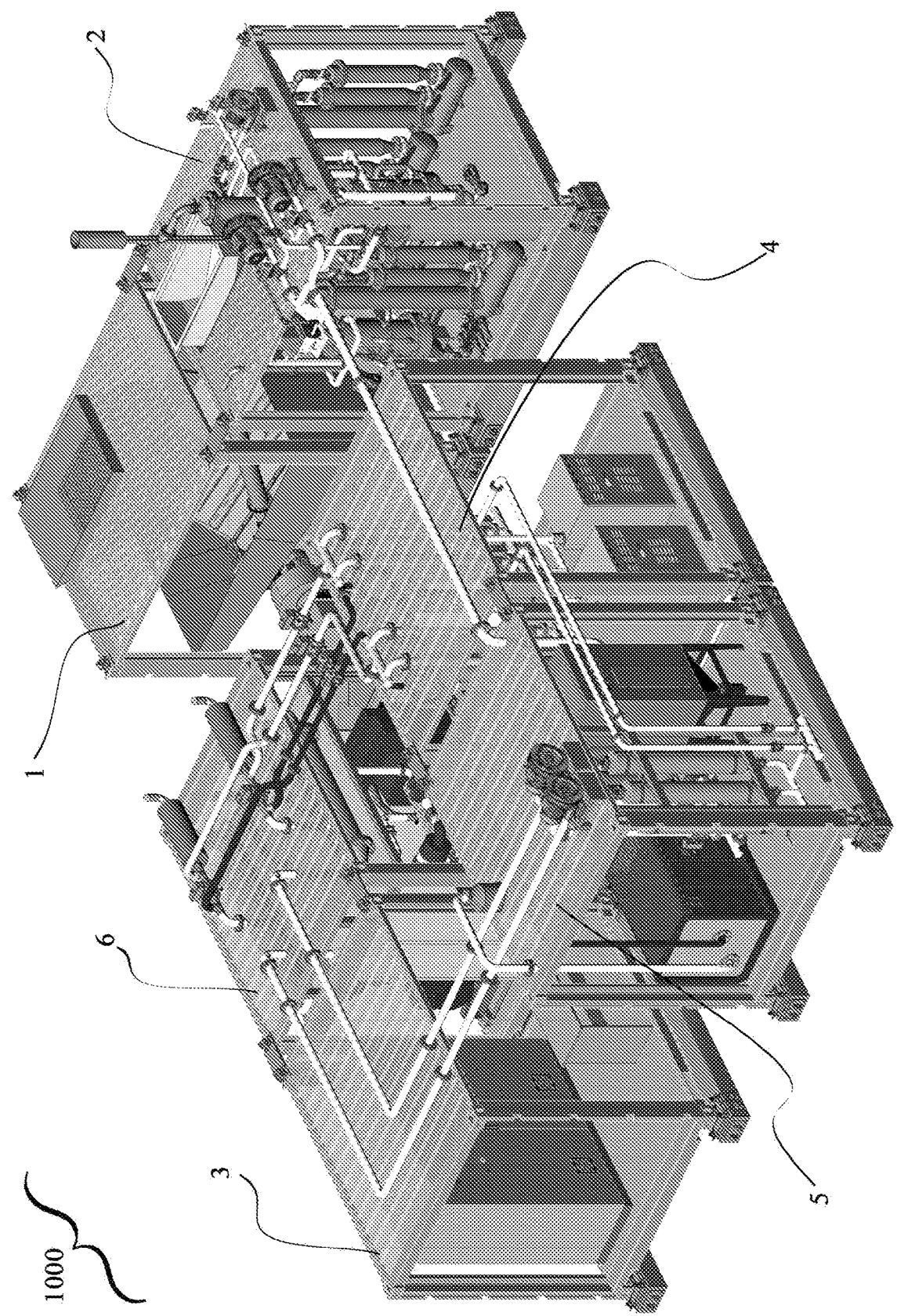

FIG. 2 shows a further perspective view of the polygeneration plant 1000 according to the present invention. The figure in question is intended to highlight the possibility of being able to variously configure the modules contained therein in the space.

Figure 3:
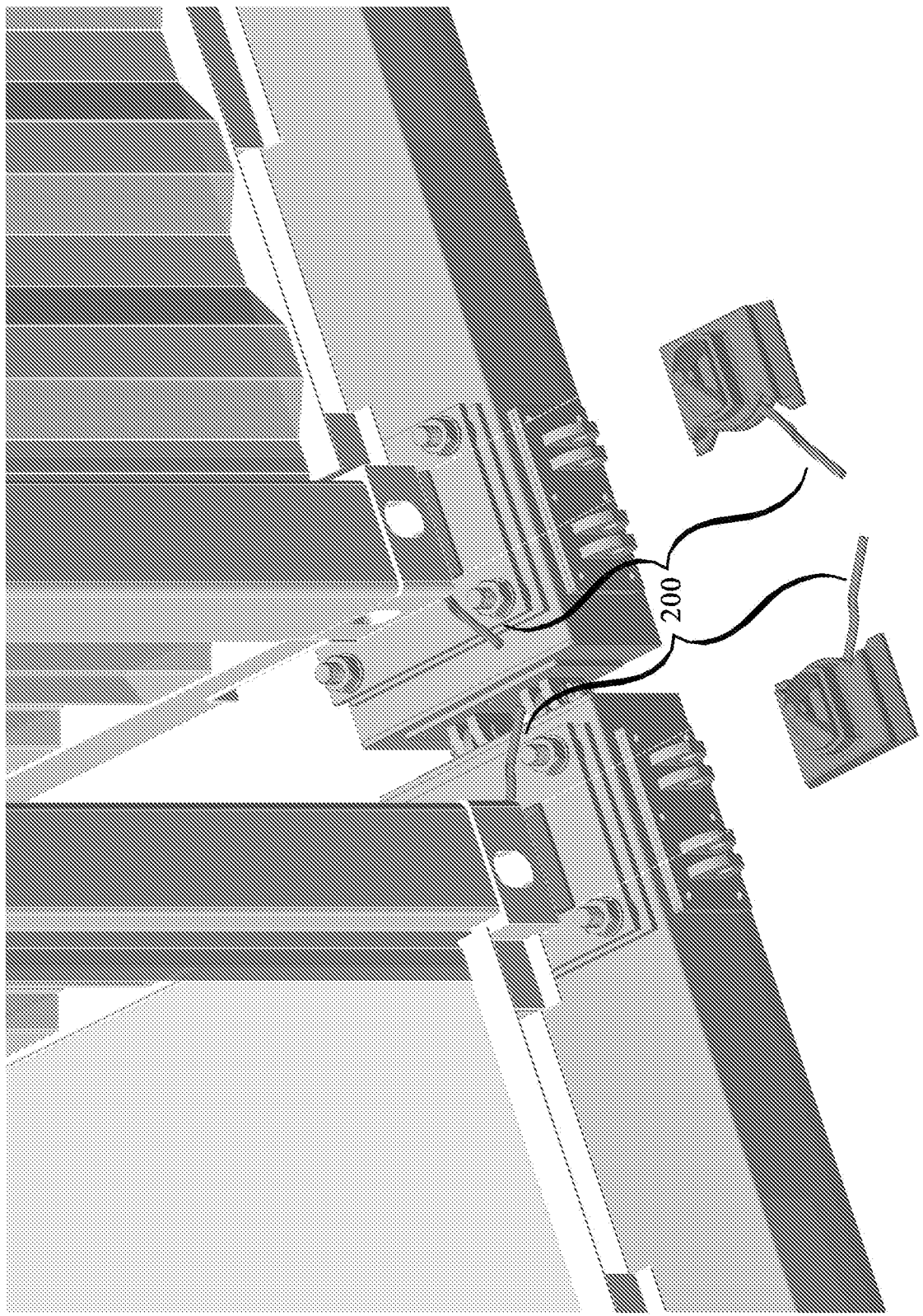
Figure 4:
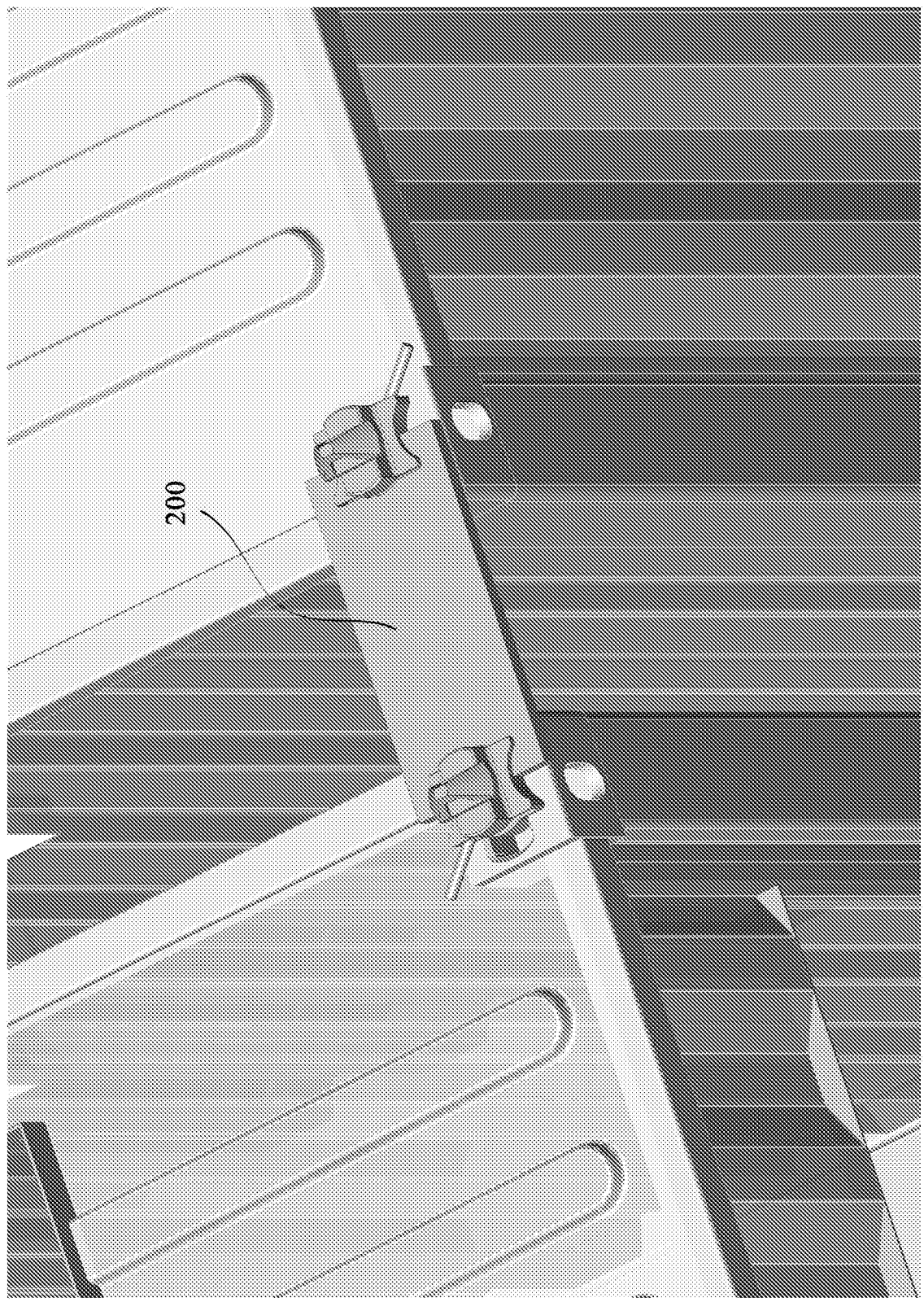

FIGS. 3 and 4 show two detailed views of a connection system 200 of the twist lock type, respectively lower and upper, when it joins the container of the modules of the polygeneration plant 1000.

Figure 5:
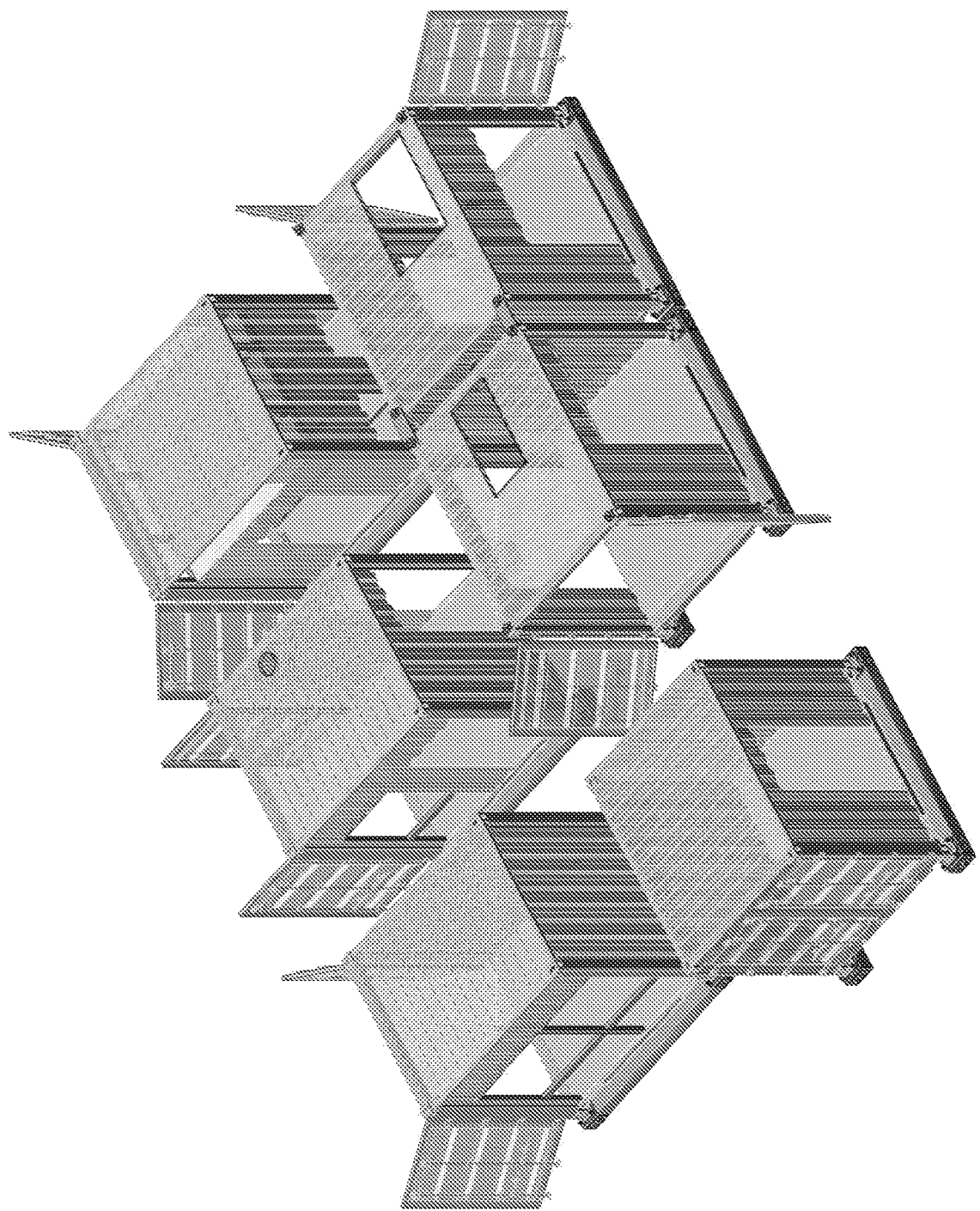

FIG. 5 shows a perspective view of the containers of all modules of the polygeneration plant 1000.

DESCRIPTION OF THE PREFERRED EMBODIMENTS

The wooden biomass-fueled polygeneration plant 1000 subject of the present industrial invention patent application is a system which, in its preferred embodiment, has a rated power of 99.8 kW, but it can also be configured for higher electrical power values, i.e. up to 200 kW or even lower up to 30 kW. In all its embodiments, said plant is characterised by its modularity and the ensuing possibility of obtaining various combinations of the modules comprised therein obtaining configurations that adapt to the corresponding interests of the appliance for which said plant operates.

More in detail, and in all its embodiments, said plant 1000 comprises at least one first module 1 for loading the biomass used as power precursor; at least one second gasification module 2 comprising at least one gasification reactor and suitable for producing syngas comprising $H_2$ and CO and at least one third module 3 for automating and controlling the process associated to said polygeneration plant.

Before getting into the merit of the present detailed description of the embodiments of said polygeneration plant 1000, it should be observed that indications regarding some mechanical and electrical components present in the aforementioned base modules will be omitted from the present description, not only due to the fact that they were exhaustively described in the aforementioned prior art patent application but also due to the fact that the essence of the present invention lies in the distinctive modularity and configurability of said plant as well as in the possibility of associating further modules characterising the object of the present invention to the aforementioned first storage module 1, second gasification module 2 and third control module 3. The entirety being obtained by providing distinctive overall configurations of the polygeneration plant.

Even more in detail, said polygeneration plant 1000 can be obtained in a plurality of configurations meeting various needs. Specifically, the performance of the plant 1000 refers to a first need condition, by the appliance, with low heat demand; a second need condition of using hydrogen for mobility or for other applications; and a third need condition of re-utilising the $CO_2$ produced through the direct use of the fumes or through the separation at a special concentration unit located in the specialised module.

Specifically, said low heat consumption need corresponds to at least two configurations: i.e. at least one first configuration in which said plant comprises at least the first biomass loading module 1; at least the second gasification module 2; at least the third automation and control module 3 and it is characterised in that it provides for at least one fourth module 4 comprising at least one fuel cell that can be fueled with syngas. More in detail, in this first configuration of the polygeneration plant 1000 the fuel is gasified in the gasification reactors. Syngas is cleaned of impurities and sent to the fuel cell for the combined production of electrical power and heat through the recovery of the cell cooling air. Typically but not limitedly, said fuel cell is of the SOFC or MCFC type.

Said second configuration of the plant 1000, also corresponding to the low heat consumption need, provides for that said polygeneration plant 1000 comprises at least the first biomass loading module 1; at least the second gasification module 2; at least the third automation and control module 3 and it is characterised in that it further comprises the fourth module 4 comprising the fuel cell/s; at least one fifth hydrogen separation module 5 and at least one sixth cogeneration module 6. More in detail, said second configuration of the polygeneration plant 1000, corresponding to the low heat consumption need condition, provides for that the initial fuel be gasified in the gasification reactors, that the syngas be cleaned of impurities and be sent to the hydrogen separation unit; that the hydrogen thus separated be sent to a fuel cell, preferably at low temperature, by way of non-limiting example of the PEMFC, AFC, PAFC type etc., while the remainder of the gas is sent to the internal combustion engines for producing electrical power by coupling with the electric generators and heat by means of recovery exchangers.

Said need condition, by the appliance, to have $H_2$ for mobility, or for other applications in any case, corresponds to at least two configurations of the polygeneration plant 1000 and in particular at least one third configuration in which said plant—besides said first biomass loading module 1, second gasification module 2, third automation and control module 3—comprises the fifth hydrogen separation module 5 and the sixth cogeneration module 6. Basically, said third configuration of the polygeneration plant 1000 differs from the second configuration of the plant due to the absence of the fourth module 4 comprising the fuel cell. More in detail, said third configuration of the plant in question provides for that: the fuel be gasified in the gasification reactors; the syngas thus produced in the gasification reactors be cleaned of the impurities and sent to the hydrogen separation unit, i.e. in the corresponding fifth module 5; that the separated hydrogen be compressed in line by the compressors to prepare it for the due end purposes, while the remainder of the gas is sent to the internal combustion engines for producing electrical power by coupling with the electric generators, and heat by means of recovery exchangers.

The same need condition, by the appliance, aimed at using hydrogen for mobility and/or for other applications, corresponds to a fourth functional configuration of the plant modules obtaining a polygeneration plant 1000 comprising the first biomass loading module 1; the second gasification module 2, the third automation and control module 3 and it is charactered by the presence of the fifth automation and control module 5 as well as the fourth module 4 comprising the fuel cell/s. Said fourth configuration substantially differs from the aforementioned second configuration, corresponding to the low heat consumption need condition, due to the absence of the sixth cogeneration module 6.

More in detail, said fourth configuration of the polygeneration plant 1000 provides for that the initial fuel be gasified in the gasification reactors; that the syngas be cleaned of impurities and sent to a hydrogen separation unit; that the separated hydrogen be compressed in line to be prepared for the end purposes, while the remainder of the gas is sent to the fuel cell/s, by way of non-limiting example to a cell of the SOFC or MCFC type for the combined production of electrical power and heat by recovering the cell/s cooling air.

Still regarding the condition aimed at using hydrogen for mobility or for other applications, there is a fifth configuration of the plant 1000 in which said plant is a set of modules functionally configured in a manner similar to that of the aforementioned second configuration of the plant 1000 but substantially different from the latter from an operative standpoint. As a matter of fact, though comprising—besides the first biomass loading module 1; the second gasification module 2; the third automation and control module 3; said fourth module 4 containing the fuel cell; said fifth hydrogen separation module 5; and the sixth cogeneration module 6—said plant operates in a manner such that the fuel is gasified in the gasification reactors; that the syngas is cleaned of impurities and sent to the hydrogen separation unit; and that the separated hydrogen be: a) partly compressed in line to prepare it for the end purposes b) partly sent to a fuel cell located in the corresponding module and of any type (by way of non-limiting example, said fuel cell is a PEMFC, SOFC, PAFC, MCFC cell) for the combined production of electrical power and heat by recovering the cell cooling air, while the remainder of the gas is sent to the internal combustion engines for producing electrical power by coupling with the electric generators, and heat by means of recovery exchangers.

Lastly, as regards the polygeneration plant 1000 subject of the present invention there is a sixth configuration corresponding to the need condition, by the user, to recover and use the $CO_2$ produced by the plant operative cycles. More in detail, rather than the distinctive spatial arrangement of the modules, this condition is more characterised by the mode according to which said polygeneration plant 1000 can operate. More clearly, said sixth configuration can be represented by any of the aforementioned configurations of the plant. However, the re-utilisation of $CO_2$ through the direct sending of the burnt/exhausted gases of the internal combustion engine and/or of the fuel cell in a greenhouse, i.e. sending the gases to a $CO_2$ concentration/separation unit prior to said sending to the greenhouse, is provided for.

The present industrial invention patent application also refers to a method for converting the biomass associated to the various configurations of the polygeneration plant 1000 as described above.

As repeated severally in the present description, the characteristic that confers versatility to the polygeneration plant 1000 in question lies in its modularity and configurability, i.e. in the possibility of variously configuring said modules. Specifically, all components of each module are contained in the container reversibly connectible to each other by means of connection systems 200 known and available in the market by way of non-limiting example, said connection systems are of the twist lock type.

By way of non-limiting example, it should be observed that the systems and technologies applied for separating hydrogen are those known in the market. For example, in some of its embodiments, the polygeneration plant 1000 is integrated with hydrogen separation systems with membrane columns possibly integrated with PSA, Pressure Swing Adsorption, devices suitably modifiable and manageable by the plant automation and control system.

As previously mentioned by the present description, indications regarding all known mechanical and electrical components comprised in said plant for obtaining the modules thereof were omitted assuming that a man skilled in the art understands their presence, represented in the attached figures, and pointing out that the essence of the present invention lies in the versatility of the polygeneration plant and, specifically, in the modules comprised therein and in the possibility of arranging them so as to obtain configurations of the plant corresponding to specific and variable needs by the appliance. It is also pointed out that all modules of the plant comprise containers, connectible with said connection systems 200, suitable for containing the components of the corresponding modules.

The invention claimed is:

1. A biomass-fueled polygeneration plant (1000), with rated power between 30 kW and 200 kW, comprising:
   at least one first module (1) configured for loading said biomass;
   at least one second module (2) configured for production of syngas starting from said biomass, said second module (2) comprising at least one gasification reactor (20);
   at least one third module (3) configured for automating and controlling a polygeneration process associated to said plant (1000), said third module (3) comprising at least one electric panel, at least one interconnection panel, and at least one monitoring station managed by SCADA control systems; and
   at least one fourth module (4) comprising at least one fuel cell
   each of the first, second, third, and fourth modules configured such that all components comprised therein are contained in containers that are reversibly joinable to each other by means of connection systems (200).

2. The polygeneration plant (1000) according to claim 1, further comprising:
   at least one fifth module (5) configured for separating hydrogen gas from syngas previously produced in said at least one gasification reactor (20) of the second module (2),
   wherein said polygeneration plant (1000) is configured such that the hydrogen gas separated in said fifth module (5), by hydrogen separators (50), is compressed in line by means of at least one compressor so as to be prepared for final use thereof, while a remaining gasification gas is sent to the at least one fuel cell of the fourth module (4) for combined production of electrical power and production of heat by recovering cell cooling air.

3. The polygeneration plant (1000) according to claim 2, further comprising:
   at least one sixth module (6) comprising at least one internal combustion engine (60),
   wherein an initial biomass is gasified in the at least one gasification reactor (20) of said second module (2), and the syngas is cleaned of impurities and sent to the hydrogen separators.

4. The polygeneration plant of claim 3, wherein said hydrogen gas is at least partly sent to the at least one fuel cell, while a remainder of the previously produced syngas, or said syngas as a whole, is sent to said at least one internal combustion engine (60) for producing power by coupling with electric generators and for producing heat by means of recovery exchangers.

5. The polygeneration plant (1000) according to claim 4, further comprising:
   systems for recovering produced $CO_2$, said produced $CO_2$ being separated using absorption separators contained in the fourth module (4).

6. The polygeneration plant (1000) according to claim 3, further comprising:
   systems for recovering produced $CO_2$, said produced $CO_2$ being separated using absorption separators contained in the fourth module (4).

7. The polygeneration plant (1000) according to claim 2, wherein the hydrogen separators (50) are membrane columns and/or of the PSA type that can be suitably modified and managed by the plant automation and control system.

8. The polygeneration plant (1000) according to claim 2, further comprising:
systems for recovering produced $CO_2$, said produced $CO_2$ being separated using absorption separators contained in the fourth module (4).

9. The polygeneration plant (1000) according to claim 1, further comprising:
systems for recovering produced $CO_2$, said produced $CO_2$ being separated using absorption separators contained in the fourth module (4).

10. The polygeneration plant (1000) according to claim 1, wherein said plant has an electrical rated power of 99.8 kW.

11. The polygeneration plant (1000) according to claim 1, wherein the connection systems (200) are of twist-lock type.

12. The polygeneration plant (1000) according to claim 1, wherein the initial biomass is formed of virgin wood chips and/or by virgin wood briquettes.

13. The polygeneration plant (1000) according to claim 1, wherein the initial biomass is formed of briquettes obtained from organic fraction of municipal solid waste (OFMSW).

14. The polygeneration plant (1000) according to claim 1, wherein the initial biomass is formed of briquettes obtained from organic sludge.

15. The polygeneration plant (1000) according to claim 1, wherein the initial biomass is formed of briquettes obtained from the digestate obtained from anaerobic digestion processes.

16. The polygeneration plant (1000) according to claim 1,
wherein said first module (1) comprises a system (10) for screening, crushing, drying and briquetting biomass on board a machine, and
wherein gasification occurs with enrichment of water vapour or air enriched with $O_2$.

17. The polygeneration plant (1000) according to claim 16, further comprising:
at least one fifth module (5) configured for separating hydrogen gas from syngas previously produced in said at least one gasification reactor (20) of the second module (2),
wherein said polygeneration plant (1000) is configured such that the hydrogen gas separated in said fifth module (5), by hydrogen separators (50), is compressed in line by means of at least one compressor so as to be prepared for final use thereof, while a remaining gasification gas is sent to the at least one fuel cell of the fourth module (4) for combined production of electrical power and production of heat by recovering cell cooling air.

18. The polygeneration plant (1000) according to claim 17, further comprising:
at least one sixth module (6) comprising at least one internal combustion engine (60),
wherein an initial biomass is gasified in at the least one gasification reactor (20) of said second module (2), and the syngas is cleaned of impurities and sent to the hydrogen separators, said hydrogen gas being at least partly sent to the at least one fuel cell, while a remainder of the previously produced syngas, or said syngas as a whole, is sent to said at last one internal combustion engine (60) for producing power by coupling with electric generators and for producing heat by means of recovery exchangers.

19. The polygeneration plant (1000) according to claim 16, further comprising:
systems for recovering produced $CO_2$, said produced $CO_2$ being separated using absorption separators contained in the fourth module (4).

20. The polygeneration plant (1000) according to claim 1, wherein said at least one fuel cell is of SOFC, MCFC, PEMFC, PAFC, or AFC type.

\* \* \* \* \*